US010809674B2

(12) United States Patent
Lu et al.

(10) Patent No.: US 10,809,674 B2
(45) Date of Patent: Oct. 20, 2020

(54) MODEL-PLANT MISMATCH DETECTION USING MODEL PARAMETER DATA CLUSTERING FOR PAPER MACHINES OR OTHER SYSTEMS

(71) Applicant: Honeywell Limited, Mississauga (CA)

(72) Inventors: Qiugang Lu, Vancouver (CA); R. Bhushan Gopaluni, Vancouver (CA); Michael G. Forbes, North Vancouver (CA); Philip D. Loewen, North Vancouver (CA); Johan U. Backstrom, North Vancouver (CA); Guy A. Dumont, Vancouver (CA)

(73) Assignee: Honeywell Limited, Mississauga (CA)

( * ) Notice: Subject to any disclaimer, the term of this patent is extended or adjusted under 35 U.S.C. 154(b) by 313 days.

(21) Appl. No.: 15/636,347

(22) Filed: Jun. 28, 2017

(65) Prior Publication Data
US 2018/0081328 A1 Mar. 22, 2018

Related U.S. Application Data

(60) Provisional application No. 62/395,950, filed on Sep. 16, 2016.

(51) Int. Cl.
*G05B 13/04* (2006.01)
*G05B 17/02* (2006.01)
(Continued)

(52) U.S. Cl.
CPC ........... *G05B 13/041* (2013.01); *G05B 13/04* (2013.01); *G05B 17/02* (2013.01); *G05B 23/0254* (2013.01); *G05B 2219/25298* (2013.01)

(58) Field of Classification Search
CPC .. G05B 13/041; G05B 13/04; G05B 23/0254; G05B 17/02; G05B 2219/25298
(Continued)

(56) References Cited

U.S. PATENT DOCUMENTS 5,351,184 A 9/1994 Lu et al.
5,561,599 A 10/1996 Lu
(Continued)

FOREIGN PATENT DOCUMENTS

WO 2008139006 A1 11/2008
WO 2010138452 A1 12/2010

OTHER PUBLICATIONS

Badwe, Abhijit, et al., "Quantifying the impact of model-plant mismatch on controller performance," Journal of Process Control, No. 20, 2010, pp. 408-425.
(Continued)

*Primary Examiner* — Robert E Fennema
*Assistant Examiner* — Jigneshkumar C Patel

(57) ABSTRACT

A method includes repeatedly identifying one or more values for one or more model parameters of at least one model associated with a process. The one or more values for the one or more model parameters are identified using data associated with the process. The method also includes clustering the values of the one or more model parameters into one or more clusters. The method further includes identifying one or more additional values for the one or more model parameters using additional data associated with the process. In addition, the method includes detecting a mismatch between the at least one model and the process in response to determining that at least some of the one or more additional values fall outside of the one or more clusters. The values could be clustered using a support vector machine.

17 Claims, 6 Drawing Sheets

(51) Int. Cl.
G05B 23/02 (2006.01)
G05B 19/418 (2006.01)
(58) Field of Classification Search
USPC .......................................................... 700/30
See application file for complete search history.

(56) References Cited

U.S. PATENT DOCUMENTS

| | | | |
|---|---|---|---|
| 5,572,420 A | 11/1996 | Lu | |
| 5,574,638 A | 11/1996 | Lu | |
| 5,758,047 A | 5/1998 | Lu et al. | |
| 6,055,483 A | 4/2000 | Lu | |
| 6,122,555 A | 9/2000 | Lu | |
| 6,253,113 B1 | 6/2001 | Lu | |
| 6,697,767 B2 | 2/2004 | Wang et al. | |
| 2002/0111758 A1 | 8/2002 | Wang et al. | |
| 2007/0078529 A1 | 4/2007 | Thiele et al. | |
| 2008/0183311 A1* | 7/2008 | MacArthur | G05B 17/02 700/29 |
| 2009/0204233 A1* | 8/2009 | Zhan | G05B 17/02 700/29 |
| 2010/0030521 A1* | 2/2010 | Akhrarov | G06K 9/622 702/182 |
| 2010/0205124 A1* | 8/2010 | Ben-Hur | G06K 9/6215 706/12 |
| 2011/0130850 A1 | 6/2011 | Zheng et al. | |
| 2013/0041482 A1* | 2/2013 | Badwe | G05B 13/048 700/29 |
| 2014/0358254 A1 | 12/2014 | Chu et al. | |
| 2015/0112900 A1* | 4/2015 | Ariyoshi | G06N 20/00 706/12 |
| 2015/0268645 A1 | 9/2015 | Shi et al. | |
| 2016/0357162 A1 | 12/2016 | He et al. | |

OTHER PUBLICATIONS

Badwe, Abhijit, et al., "Detection of model-plant mismatch in MPC applications," Journal of Process Control, No. 19, 2009, pp. 1305-1313.
Bombois, Xavier, et al., "Identification for robust H2 deconvolution filtering," Automatica, No. 46, 2010, pp. 577-584.
Botelho, Viviane, et al., "Perspectives and Challenges in Performance Assessment of Model Predictive Control," The Canadian Journal of Chemical Engineering, vol. 94, Jul. 2016, pp. 1225-1241.
Boyd, Stephen, et al., "Linear Matrix Inequalities in System and Control Theory," Society for Industrial and Applied Mathematics, Philadelphia, PA, 1994, 205 pages.
Chu, Danlei, et al., "Online CD Performance Monitoring and Automatic Alignment Correction," Honeywell Process Solutions, North Vancouver, BC, Canada, PaperCon 2011, pp. 945-955.
Desborough, Lane, et al., "Performance Assessment Measures for Univariate Feedback Control," The Canadian Journal of Chemical Engineering, vol. 70, Dec. 1992, pp. 1186-1197.
Duncan, Stephen R., et al., "Evaluating the Performance of Cross-Directional Control Systems," Proceedings of be American Control Conference, San Diego, CA, Jun. 1999, pp. 3092-3096.
Duncan, Stephen, et al., "Performance Monitoring for Cross-Directional Control Systems," Control Systems 2000, pp. 173-177.
Fan, Junqiang, "Model Predictive Control for Multiple Cross-Directional Processes: Analysis, Tuning, and Implementation," Doctoral Thesis, Department of Electrical and Computer Engineering, University of British Columbia, Sep. 2003, 172 pages.
Featherstone, Andrew, et al., "Identification and Control of Sheet and Film Processes," Advances in Industrial Control, Springer-Verlag London Ltd., 2000, 23 pages.
Forssell, Urban, et al., "Closed-loop identification revisited," Automatica, No. 35, 1999, pp. 1215-1241.
Forssell, Urban, "Closed-loop Identification Methods, Theory, and Applications," Linkoping Studies in Science and Technology, Dissertations, No. 566, Department of Electrical Engienering, Linkoping University, Linkoping, Sweden, 1999, 263 pages.
Fukushima, Hiroaki, et al, "Adaptive model predictive control for a class of constrained linear systems based on the comparison model," Automatica, No. 43, 2007, pp. 301-308.
Gevers, Michel, et al., "Optimal Experiment Design for Open and Closed-Loop System Identification," research results from the Belgian Programme on Interuniversity Attraction Poles, Belgian Federal Science Policy Office, Jan. 2011, 24 pages.
Gevers, Michel, et al., "Optimal Experiment Designs with Respect to the Intended Model Application," Automatica, vol. 22, No. 5, 1986, pp. 543-554.
Severs, Michel, et al., "Identification and the Information Matrix: How to Get Just Sufficiently Rich?," IEEE Transactions on Automatic Control, vol. 54, No. 12, Dec. 2009, pp. 2828-2840.
Goowdin, Graham C., et al., Dynamic System, Identifications: Experiment Design and Data Analysis, Mathematics in Science and Engineering, vol. 136, Academic Press, 1977, 56 pages.
Gopaluni, R. Bhushan, et al., "Identification of Symmetric Noncasual Processes: Cross-Directional Response Modelling of Papers Machines," Proceedings of the 45th IEEE Conference on Decision & Control, San Diego, CA, Dec. 13-15, 2006, pp. 6744-6749.
Gorinevsky, Dimitry M., et al., "Identification Tool for Cross-Directional Processes," IEEE Transactions on Control Systems Technology, vol. 11, No. 5, Sep. 2003, pp. 629-640.
Grimble, M.J., "Generalized Minimum Variance Control Law Revisited," Optimal Control Applications & Methods, vol. 9, 1988, pp. 63-77.
Grimble, M.J., et al., "Weighting Selection for Controller Benchmarking and Tuning," IST-2000-29239 PAM, Performance Assessment and Benchmarking of Controls, 2001-2004, ICC/219/Dec. 2004, PAM Document Code: PAM-12-TN-1-V1, Industrial Control Centre, University of Strathclyde, UK, Dec. 6, 2004, 15 pages.
Harris, Thomas J., "Assessment of Control Loop Performance," The Canadian Journal of Chemical Engineering, vol. 67, Oct. 1989, pp. 856-861.
Harris, T. J., et al., "Performance Assessment of Multivariable Feedback Controllers," Automatica, vol. 32, No. 11, 1996, pp. 1505-1518.
Harris, T. J., et al., "A review of performance monitoring and assessment techniques for univariate and multivariate control systems," Journal of Process Control 9, 1999, pp. 1-17.
Harrison, Christopher A., et al., "Discriminating between disturbance and process model mismatch in model predictive control," Journal of Process Control, No. 19, 2009, pp. 1610-1616.
Hjalmarsson, Hakan, et al., "For Model-based Control Design, Closed-loop Identification Gives Better Performance," Automatica, vol. 32, No. 12, 1996, pp. 1659-1673.
Honeywell, "Experion MX Color Control," Product Information Note, Model Q5976-51, 52, and 53, Automation & Control Solutions, Process Solutions, May 2011, 5 pages.
Honeywell, "Experion MX Color Shade Change Control," Product Information Note, Model Q5979-50, Automation & Control Solutions, Process Solutions, May 2011, 4 pages.
Honeywell, "Experion MX Machine Direction Controls," Product Information Note, Automation & Control Solutions, Process Solutions, May 2011, 3 pages.
Honeywell, "Honeywell Process Solutions," White Paper, Experion MX—Quality Control System Delivers Lowest Total Cost of Ownership, Automation & Control Solutions, Process Solutions, Sep. 2010, 8 pages.
Huang, Biao, et al., "Performance Assessment of Control Loops, Theory and Applications," Advances in Industrial Control, Springer-Verlag London Ltd., 1962, 16 pages.
Huang, Biao, et al., "On-Line Control Performance Monitoring of Mimo Processes," WP9-3:50, Proceedings of the American Control Conference, Seattle, Washington, Jun. 1995, pp. 1250-1254.
Huang, Biao, et al., "Performance Assessment of Multivariate Control Loops on a Paper-Machine Headbox," The Canadian Journal of Chemical Engineering, vol. 75, Feb. 1997, pp. 134-142.

(56) References Cited

OTHER PUBLICATIONS

Jansson, Henrik, et al., "Input Design Via LMIs Admitting Frequency-Wise Model Specifications in Confidence Regions," IEEE Transactions on Automatic Control, vol. 50, No. 10, Oct. 2005, pp. 1534-1549.

Jansson, Henrik, "Experiment Design with Applications in Identification for Control," Doctoral Thesis, Automatic Control, Department of Signals, Sensors and Systems, Royal Institute of Technology, Stockholm, Sweden, 2004, 217 pages.

Jelali, Mohieddine, "Control Performance Management in Industrial Automation, Assessment, Diagnosis and Improvement of Control Loop Performance," Advances in Industrial Control, Springer-Verlag London, 2013, 32 pages.

Ko, Byung-Su, et al., "Performance Assessment of Constrained Model Predictive Control Systems," Process Systems Engineering, AIChE Journal, vol. 47, No. 6, Jun. 2001, pp. 1363-1371.

Li, Q., et al., "A relative performance monitor for process controllers," International Journal of Adaptive Control and Signal Processing, No. 17, 2003, pp. 685-708.

Ljung, Lennart, "System Identification Theory for the User, Second Edition," Linkoping University, Sweden, Prentice Hall PTR, New Jersey, 1999, 129 pages.

Ljung, Lennart, et al., "Asymptotic Properties of Black-Box Identification of Transfer Functions," IEEE Transactions on Automatic Control, vol. AC-30, No. 6, Jun. 1985, pp. 514-530.

Ljung, Lennart, "Asymptotic Variance Expressions for Identified Black-Box Transfer Function Models," IEEE Transactions on Automatic Control, vol. AC-30, No. 9, Sep. 1985, pp. 834-844.

Lynch, C.B., et al., "Control Loop Performance Monitoring," IEEE Transactions on Control Systems Technology, vol. 4, No. 2, Mar. 1996, pp. 185-192.

Mehra, Raman K., "Optimal Input Signals for Parameter Estimation in Dynamic Systems—Survey and New Results," IEEE Transactions on Automatic Control, vol. AC-19, No. 6, Dec. 1974, pp. 753-768.

Ordys, Andnzej W., et al., "Process Control Performance Assessment From Theory to Implementation" Advances in Industrial Control, Springer-Verlag London Limited, 2007, 53 pages.

Qin, S. Joe, "Control performance monitoring—a review and assessment," Computers and Chemical Engineering, No. 23, 1998, pp. 173-186.

Roweis, Sam T., et al., "Nonlinear Dimensionality Reduction by Locally Linear Embedding," Science, vol. 290, Dec. 22, 2000, www.sciencemag.org, pp. 2323-2326.

Scholkopf, Bernhard, et al., "Estimating the Support of a High-Dimensional Distribution," Massachusetts Institute of Technology, Neural Computation No. 13, 2001, pp. 1443-1471.

Shardt, Yuri A.W., et al., "Closed-loop identification with routine operating data: Effect of time delay and sampling time," Journal of Process Control, No. 21, 2011, pp. 997-1010.

Stewart, Gregory Edward, "Two Dimensional Loop Shaping Controller Design for Paper Machine Cross-Directional Processes," Doctoral Thesis, Department of Electrical and Computer Engineering, The University of British Columbia, Aug. 2000, 143 pages.

Sun, Zhijie, et al., "Performance monitoring of model-predictive controllers via model residual assessment," Journal of Process Control, No. 23, 2013, pp. 473-482.

Suykens, J.A.K., et al., "Least Squares Support Vector Machine Classifiers," Neural Processing Letters, No. 9, 1999, pp. 293-300.

Taylor, A.R., et al., "Bayesian Methods for Control Loop Performance Assessment in Cross-Directional Control," Department of Engineering, University of Oxford, UK, Jan. 2005, 6 pages.

Thornhill, N.F., et al., "Refinery-wide control loop performance assessment," Journal of Process Control, No. 9, 1999, pp. 109-124.

Duncan, "The cross directional control of a web forming process," Ph.D thesis, University of London, 1989, 137 pages.

Zarrop, "Optimal experiment design for dynamic system identification," Ph.D thesis, Imperial College London (University of London), 1977, 180 pages.

Vanantwerp, Jeremy G., et al., "Cross-directional control of sheet and film processes," ScienceDirect, Automatica, No. 43, 2007, pp. 191-211.

Wang, Siyun, et al., "Autocovariance-Based MPC Model Mismatch Estimation for SISO Systems," 2015 IEEE 54th Annual Conference on Decision and Control (CDC), Osaka, Japan, Dec. 15-18, 2015, pp. 3032-3037.

Yerramilli, Suraj, et al., "Detection and diagnosis of model-plant mismatch in MIMO systems using plant-model ratio," ScienceDirect, IFAC-PapersOnLine 49-1, 2016, pp. 266-271.

Zhu, Yucai, et al., "The Box-Jenkins Steiglitz-McBride algorithm," Automatica, No. 65, 2016, pp. 170-182.

U.S. Appl. No. 15/636,419, filed Jun. 28, 2017, entitled "Closed-Loop Model Parameter Identification Techniques for Industrial Model-Based Process Controllers.".

U.S. Appl. No. 15/636,347, filed Jun. 28, 2017, entitled "Model-Plant Mismatch Detection Using Model Parameter Data Clustering for Paper Machines or Other Systems.".

Bai, Er-Wei, et al., "Convergence of the Iterative Hammerstein System Identification Algorithm," IEEE Transactions on Automatic Control, vol. 49, No. 11, Nov. 2004, pp. 1929-1940.

Bemporad, Alberto, et al., "The explicit linear quadratic regulator for constrained systems," Automatica, No. 38, 2002, pp. 3-20.

Bergh, Luis G., et al., "Spatial Control of Sheet and Film Forming Processes," The Canadian Journal of Chemical Engineering, vol. 65, Feb. 1987, pp. 148-155.

Cortes, Corinna, et al., "Support-Vector Networks," Machine Learning, No. 20, 1995, pp. 273-297.

Gevers, Michel, et al., "Identification and the Information Matrix: How to Get Just Sufficiently Rich?," IEEE Transactions on Automatic Control, vol. 54, No. 12, Dec. 2009, pp. 2828-2840.

Giri, Fouad, et al., "Block-Oriented Nonlinear System Identification," Lecture Notes in Control and Information Sciences, Springer-Verlag, 2010, 11 pages.

Golub, Gene, et al., "Separable non-linear least squares: the variable projection method and its applications," Institute of Physics Publishing, Inverse Problems, No. 19, Feb. 14, 2003, 26 pages.

Golub, Gene, et al., "The Differentiation of Pseudo-Inverses and Nonlinear Least Squares Problems Whose Variables Separate," SIAM Journal of Numerical Analysis, vol. 10, No. 2, Apr. 1973, pp. 413-432.

Julien, Rhonda H., et al., "Performance assessment using a model predictive control benchmark," Journal of Process Control, No. 14, 2004, pp. 441-456.

Ljung, Lennart, "Convergence Analysis of Parametric Identification Methods," IEEE Transactions on Automatic Control, vol. AC-23, No. 5, Oct. 1978, pp. 770-783.

Ljung, Lennart, et al., "Asymptotic Properties of the Least-Squares Method for Estimating Transfer Functions and Disturbance Spectra," Advances in Applied Probability, No. 24, 1992, pp. 412-440.

Lu, Qiugang, et al., "Performance Assessment of Cross-Directional Control for Paper Machines," IEEE Transactions on Control Systems Technology, vol. 25, No. 1, Jan. 2017, pp. 208-221.

Mahata, Kaushik, et al., "Large Sample Properties of Separable Nonlinear Least Squares Estimators," IEEE Transaction on Signal Processing, vol. 52, No. 6, Jun. 2004, pp. 1650-1658.

Morales, Rafael, M., et al., "The Robustness and Design of Constrained Cross-Directional Control via Integral Quadratic Constraints," IEEE Transactions on Control Systems Technology, vol. 19, No. 6, Nov. 2011, pp. 1421-1432.

Niarendra, K. S., et al., "An Iterative Method for the Identification of Nonlinear Systems Using a Hammerstein Model," IEEE Transactions on Automatic Control, Jul. 1966, pp. 546-550.

Olivier, Laurentz E., et al., "Model-Plant mismatch detection and model update for a run-of-mine ore milling circuit under model predictive control," Journal of Process Control, No. 23, 2013, pp. 100-107.

Qin, S. Joe, et al., "A survey of industrial model predictive control technology," Control Engineering Practice, No. 11, 2003, pp. 733-764.

Rawlings, James B., et al., "Gage Control of Film and Sheet-Forming Processes," American Institute of Chemical Engineers Journal, vol. 42, No. 3, Mar. 1996, pp. 753-766.

(56) References Cited

OTHER PUBLICATIONS

Rigopoulos, Apostolos, et al., "Identification of Full Profile Disturbance Models for Sheet Forming Processes," American Institute of Chemical Engineers Journal, vol. 43, No. 3, 1997, pp. 727-739.
Shardt, Yuri A.W., et al., "Closed-loop identification condition for ARMAX models using routine operating data," Automatica, No. 47, 2011, pp. 1534-1537.
Soderstrom, Torsten, et al., "System Identification," Prentice Hall, 1989, 43 pages.
Steinwart, Ingo, et al., "Support Vector Machines," Springer Science + Business Media, LLC., 2008, 22 pages.
Stewart, Gregory E., et al., "Feedback Controller Design for a Spatially Distributed System: The Paper Machine Problem," IEEE Transactions on Control Systems Technology, vol. 11, No. 5., Sep. 2003, pp. 612-628.
Wang, Siyun, et al., "Data-Driven Plant-Model Mismatch Quantification in Input-Constrained Linear MPC," International Federation of Automatic Control, IFAC-PapersOnline 49-7, 2016, pp. 25-30.
Zhu, Yucai, "Estimation of an N-L-N Hammerstein-Wiener Model," 15th Triennial World Congress, Barcelona, Spain, International Federation of Automatic Control, 2002, pp. 247-252.
Babji et al., "Time-Delay Estimation in Closed-Loop Processes Using Average Mutual Information Theory", Control and Intelligent Systems, vol. 37, No. 3, 2009, 7 pages.
Badwe et al., "Closed-loop identification using direct approach and high order ARX/GOBF-ARX models", Journal of Process Control 21, 2011, 16 pages.
Bjorklund et al., "A Review of Time-Delay Estimation Techniques", Proceedings of the 42nd IEEE Conference on Decision and Control, Dec. 2003, 6 pages.
Esmaili et al., "Direct and two-step methods for closed-loop identification: a comparison of asymptotic and finite data set performance", Journal of Process Control 10, 2000, 13 pages.
Forssell et al., "A Projection Method for Closed-Loop Identification", IEEE Transactions on Automatic Control, vol. 45, No. 11, Nov. 2000, 6 pages.
Gevers et al., "Asymptotic variance expressions for closed-loop identification", Automatica 37, 2001, 6 pages.
Gustaysson et al., "Survey Paper—Identification of Processes in Closed Loop—Identifiability and Accuracy Aspects", Automatica, vol. 13, 1977, 17 pages.
Lee et al., "On Some Key Issues in the Windsurfer Approach to Adaptive Robust Control", Automatica, vol. 31, No. 11, 1995, 18 pages.
Van Den Hof et al., "An Indirect Method for Transfer Function Estimation from Closed Loop Data", Automatica, vol. 29, No. 6, 1993, 5 pages.
Wang et al., "Closed-loop identification via output fast sampling", Journal of Process Control 14, 2004, 16 pages.
Huynh, "A Modified Shuffled Frog Leaping Algorithm for Optimal Tuning of Multivariable PID Controllers", IEEE International Conference on Industrial Technology, Apr. 2008, pp. 1-6.
Biagiola et al., "Identification of Uncertain MIMO Wiener and Hammerstein Models", Computers and Chemical Engineering, Jun. 2011, vol. 35(12), 9 pages.
Maciejowski, "Predictive Control with Constraints", Pearson Education Limited, 2002, 6 pages.
Maciejowski, "Predictive Control with Constraints: Section 7.5 Reference trajectory and pre-filter", Prentice Hall, 2002, pp. 211-214.
Skogestad et al., "Multivariable Feedback Control: Analysis and Design", John Wiley & Sons, 1996, 8 pages.
Chu et al., "Model Predictive Control and Optimization for Papermaking Processes", Advanced Model Predictive Control, Jul. 2011, pp. 309-342.
Fan et al., "Two-Dimensional Frequency Response Analysis and Insights for Weight Selection in Cross-Directional Model Predictive Control", Proceedings from 42nd IEEE, Dec. 2003, 7 pages.
Garriga et al., "Model Predictive Controller Tuning via Eigenvalue Placement", 2008 American Control Conference, Jun. 2008, 6 pages.
Garriga et al., "Model Predictive Control Tuning Methods: A Review", American Chemical Society, Mar. 2010, pp. 3505-3515.
Mohtadi et al., "Frequency response characteristics of MIMO GPC", Int. J. Control, vol. 55, No. 4, 1992, 24 pages.
Rowe et al., "Tuning MPC using H∞ Loop Shaping", Proceedings of the American Control Conference, Jun. 2000, 5 pages.
Shah et al., "Tuning MPC for Desired Closed-Loop Performance for MIMO Systems", American Control Conference, Jun.-Jul. 2011, pp. 4404-4409.
DiCairano et al., "Model Predictive Control Tuning by Controller Matching", IEEE Transactions on Automatic Control, vol. 55, No. 1, Jan. 2010, pp. 185-190.
Kong et al., "Predictive metamorphic control", Automatica 49, 2013, pp. 3670-3676.
Angeli et al., "An ellipsoidal off-line MPC scheme for uncertain polytopic discrete-time systems", Automatica 44, 2008, pp. 3113-3119.
Vlassis et al., "Polytopic uncertainty for linear systems: New and old complexity results", Luxembourg Centre for Systems Biomedicine, Feb. 2014; 13 pages.
He et al., "User Friendly Robust MPC Tuning of Uncertain Paper-Making Processes", Department of Electrical and Computer Engineering, University of Alberta, Feb. 2015, 6 pages.
Hu et al., "Systematic H∞ weighting function selection and its application to the real-time control of a vertical take-off aircraft", Control Engineering Practice, vol. 8, 2000, pp. 241-252.
Bazaraa et al., "Nonlinear Programming: Theory and Algorithms", John Wiley & Sons, 1979, 3 pages.
Zhou et al., "Essentials of Robust Control: Chapter 9 Linear Fractional Transformation", Prentice Hall, 1998, 3 pages.
International Search Report dated Jun. 9, 2015 in connection with International Application No. PCT/CA2015/000146, 3 pages.
Written Opinion of the International Searching Authority dated Jun. 9, 2015 in connection with International Application No. PCT/CA2015/000146, 4 pages.
International Search Report and Written Opinion of the International Searching Authority dated Jun. 22, 2016 in connection with International Application No. PCT/CA2016/000153, 9 pages.
U.S. Appl. No. 15/611,082 entitled "Model-Plant Mismatch Detection with Support Vector Machine for Cross-Directional Process Behavior Monitoring" filed on Jun. 1, 2017, 56 pages.
U.S. Appl. No. 15/636,419 entitled "Closed-Loop Model Parameter Identification Techniques for Industrial Model-Based Process Controllers " filed on Jun. 28, 2017, 37 pages.

* cited by examiner

MODEL-PLANT MISMATCH DETECTION USING MODEL PARAMETER DATA CLUSTERING FOR PAPER MACHINES OR OTHER SYSTEMS

CROSS-REFERENCE TO RELATED APPLICATION AND PRIORITY CLAIM

This application claims priority under 35 U.S.C. § 119(e) to U.S. Provisional Patent Application No. 62/395,950 filed on Sep. 16, 2016, which is hereby incorporated by reference in its entirety.

TECHNICAL FIELD

This disclosure relates generally to industrial process control and automation systems. More specifically, this disclosure relates to model-plant mismatch detection using model parameter data clustering for paper machines or other systems.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators. Model-based industrial process controllers are one type of process controller routinely used to control the operations of industrial processes. Model-based process controllers typically use one or more models to mathematically represent how one or more properties within an industrial process respond to changes made to the industrial process.

SUMMARY

This disclosure provides model-plant mismatch detection using model parameter data clustering for paper machines or other systems.

In a first embodiment, a method includes repeatedly identifying one or more values for one or more model parameters of at least one model associated with a process. The one or more values for the one or more model parameters are identified using data associated with the process. The method also includes clustering the values of the one or more model parameters into one or more clusters. The method further includes identifying one or more additional values for the one or more model parameters using additional data associated with the process. In addition, the method includes detecting a mismatch between the at least one model and the process in response to determining that at least some of the one or more additional values fall outside of the one or more clusters.

In a second embodiment, an apparatus includes at least one memory configured to store data associated with a process. The apparatus also includes at least one processing device configured to repeatedly identify one or more values for one or more model parameters of at least one model associated with the process using the data associated with the process. The at least one processing device is also configured to cluster the values of the one or more model parameters into one or more clusters. The at least one processing device is further configured to identify one or more additional values for the one or more model parameters using additional data associated with the process. In addition, the at least one processing device is configured to detect a mismatch between the at least one model and the process in response to determining that at least some of the one or more additional values fall outside of the one or more clusters.

In a third embodiment, a non-transitory computer readable medium contains instructions that, when executed by at least one processing device, cause the at least one processing device to repeatedly identify one or more values for one or more model parameters of at least one model associated with a process. The one or more values for the one or more model parameters are identified using data associated with the process. The medium also contains instructions that, when executed by the at least one processing device, cause the at least one processing device to cluster the values of the one or more model parameters into one or more clusters. The medium further contains instructions that, when executed by the at least one processing device, cause the at least one processing device to identify one or more additional values for the one or more model parameters using additional data associated with the process. In addition, the medium contains instructions that, when executed by the at least one processing device, cause the at least one processing device to detect a mismatch between the at least one model and the process in response to determining that at least some of the one or more additional values fall outside of the one or more clusters.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, model-based industrial process controllers are one type of process controller routinely used to control the operations of industrial processes. Model-based process controllers typically use one or more models to mathematically represent how one or more properties within an industrial process respond to changes made to the industrial process. Model-based controllers typically require accurate models of process behaviors in order to perform well. As conditions related to an industrial process change, the models for that process typically need to be updated. However, it is often difficult to determine from routine operating data whether a model accurately describes the true process behavior of an industrial process. Moreover, performing an experiment to improve the quality of the data for this purpose is often undesirable because the experiment may affect the quality of one or more products being manufactured or processed in the industrial process.

As described in more detail below, this disclosure provides techniques for detecting significant model-plant mismatch using routine operating data. When mismatch is detected, existing models can be updated or new models can be created and used to control an industrial process, helping to maintain the quality of products being manufactured or processed in the industrial process.

Figure 1:
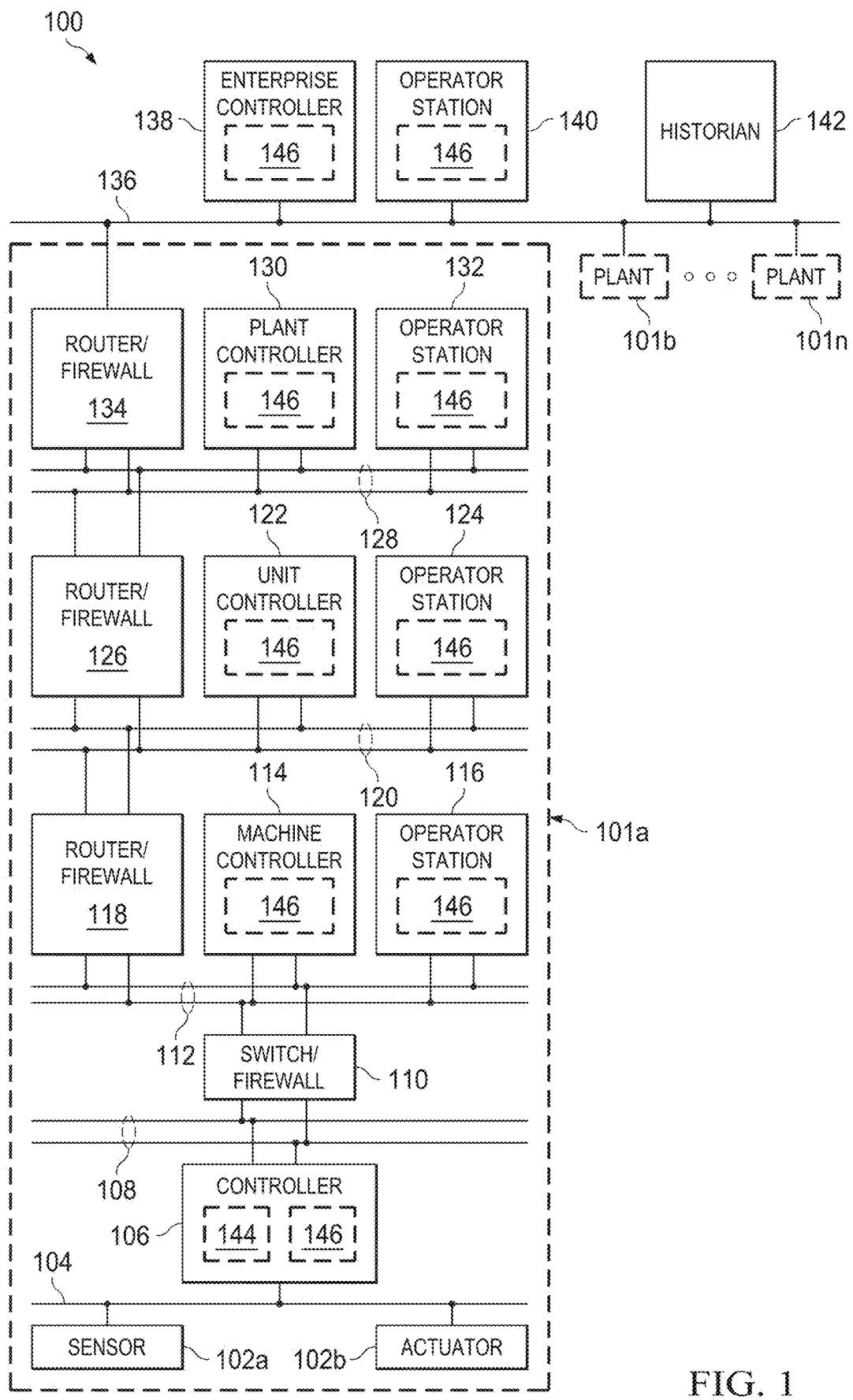
FIG. 1 illustrates a first example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

At least one of the controllers shown in FIG. 1 could denote a model-based controller that operates using one or more process models 144. For example, each of the controllers 106 could operate using one or more process models 144 to determine, based on measurements from one or more sensors 102a, how to adjust one or more actuators 102b. In some embodiments, each model 144 associates one or more manipulated or disturbance variables with one or more controlled variables. A controlled variable (CV) generally represents a variable that can be measured or inferred and that is ideally controlled to be at or near a desired setpoint or within a desired range of values. A manipulated variable (MV) generally represents a variable that can be adjusted in order to alter one or more controlled variables. A disturbance variable (DV) generally denotes a variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

As noted above, the process models 144 need to be reasonably accurate for model-based controllers to operate effectively, and the process models 144 typically need to be updated as conditions related to an industrial process change. However, it is often difficult to determine from routine operating data whether a model accurately describes the true process behavior of an industrial process, and performing experiments to gather data in order to determine whether a model accurately describes the true process behavior of an industrial process is often undesirable.

In accordance with this disclosure, at least one component of the system 100 includes a tool 146 that analyzes routine operating data for a model-based controller in order to detect significant model-plant mismatch. Example processes for detecting significant model-plant mismatch are described below. Also, as described in more detail below, the tool 146 can use a support vector machine (SVM) as part of the analysis of the routine operating data. One example benefit of using these techniques is that significant model-plant mismatch can be automatically determined so that a model-based controller can have its model 144 updated or replaced before the model-plant mismatch causes losses due to poor process control.

The tool 146 could be implemented in any suitable manner and using any suitable device. For example, the tool 146 could reside on any of the controllers or operator stations shown in FIG. 1. The tool 146 could also reside on any other suitable device(s) in FIG. 1, such as on a dedicated computing device. The tool 146 could be implemented using any suitable hardware or any suitable combination of hardware and software/firmware instructions. In particular embodiments, the tool 146 is implemented using software/firmware instructions that are executed by at least one processor of a computing device.

Although FIG. 1 illustrates one example of an industrial process control and automation system 100, various changes may be made to FIG. 1. For example, a control system could include any number of sensors, actuators, controllers, servers, operator stations, networks, models, tools, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, process control and automation systems are highly configurable and can be configured in any suitable manner according to particular needs. In addition, while FIG. 1 illustrates one example environment in which model-plant mismatch detection using model parameter data clustering can be used, this functionality can be used in any other suitable device or system.

Figure 2:
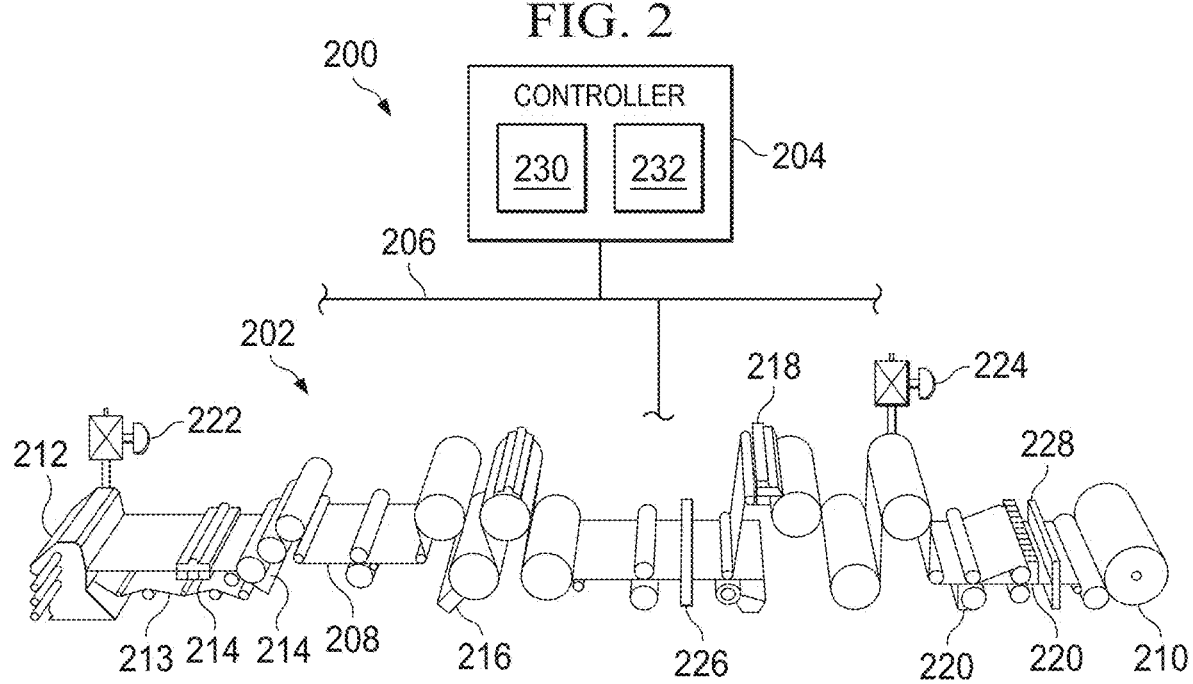
FIG. 2 illustrates a second example industrial process control and automation system according to this disclosure.

FIG. 2 illustrates a second example industrial process control and automation system 200 according to this disclosure. In particular, the system 200 of FIG. 2 denotes an example web manufacturing or processing system. As shown in FIG. 2, the system 200 includes a paper machine 202, a controller 204, and a network 206. The paper machine 202 includes various components used to produce a paper product, namely a paper web 208 that is collected at a reel 210. The controller 204 monitors and controls the operation of the paper machine 202, which may help to maintain or increase the quality of the paper web 208 produced by the paper machine 202.

In this example, the paper machine 202 includes at least one headbox 212, which distributes a pulp suspension uniformly across the machine onto a continuous moving wire screen or mesh 213. The pulp suspension entering the headbox 212 may contain, for example, 0.2-3% wood fibers, fillers, and/or other materials, with the remainder of the suspension being water. Arrays of drainage elements 214, such as vacuum boxes, remove as much water as possible to initiate the formation of the web 208. An array of steam actuators 216 produces hot steam that penetrates the paper web 208 and releases the latent heat of the steam into the paper web 208. An array of rewet shower actuators 218 adds small droplets of water (which may be air atomized) onto the surface of the paper web 208. The paper web 208 is then often passed through a calender having several nips of counter-rotating rolls. Arrays of induction heating actuators 220 heat the shell surfaces of various ones of these rolls.

Two additional actuators 222-224 are shown in FIG. 2. A thick stock flow actuator 222 controls the consistency of incoming stock received at the headbox 212. A steam flow actuator 224 controls the amount of heat transferred to the paper web 208 from drying cylinders. The actuators 222-224 could, for example, represent valves controlling the flow of stock and steam, respectively. These actuators may be used for controlling the dry weight and moisture of the paper web 208. Additional flow actuators may be used to control the proportions of different types of pulp and filler material in the thick stock and to control the amounts of various additives (such as retention aid or dyes) that are mixed into the stock.

This represents a brief description of one type of paper machine 202 that may be used to produce a paper product. Additional details regarding this type of paper machine 202 are well-known in the art and are not needed for an understanding of this disclosure. Also, while described as being used to manufacture a paper web, other types of machines for manufacturing or processing any suitable webs could be used.

In order to control the paper-making process, one or more properties of the paper web 208 may be continuously or repeatedly measured. The web properties can be measured at one or various stages in the manufacturing process. This information may then be used to adjust the paper machine 202, such as by adjusting various actuators within the paper machine 202. This may help to compensate for any variations of the web properties from desired targets, which may help to ensure the quality of the web 208. As shown in FIG. 2, the paper machine 202 includes one or more scanners 226-228, each of which may include one or more sensors. Each scanner 226-228 is capable of measuring one or more characteristics of the paper web 208. For example, each scanner 226-228 could include sensors for measuring the tension, caliper, moisture, anisotropy, basis weight, color, gloss, sheen, haze, surface features (such as roughness, topography, or orientation distributions of surface features), or any other or additional characteristics of the paper web 208.

Each scanner 226-228 includes any suitable structure or structures for measuring or detecting one or more characteristics of the paper web 208, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 204 receives measurement data from the scanners 226-228 and uses the data to control the paper machine 202. For example, the controller 204 may use the measurement data to adjust any of the actuators or other components of the paper machine 202. The controller 204 includes any suitable structure for controlling the operation of at least part of the paper machine 202, such as a computing device. Note that while a single controller 204 is shown here, multiple controllers 204 could be used, such as different controllers that control different variables of the web.

The network 206 is coupled to the controller 204 and various components of the paper machine 202 (such as the actuators and scanners). The network 206 facilitates communication between components of the system 200. The network 206 represents any suitable network or combination of networks facilitating communication between components in the system 200. The network 206 could, for example, represent a wired or wireless Ethernet network, an electrical signal network (such as a HART or FOUNDATION FIELDBUS network), a pneumatic control signal network, or any other or additional network(s).

The controller(s) 204 can operate to control one or more aspects of the paper machine 202 using one or more models 230. For example, each model 230 could associate one or more manipulated or disturbance variables with one or more controlled variables. The controlled variables typically include one or more properties of the web 208. The manipulated variables typically include setpoints, settings, or other values used by various actuators in the system 200.

In accordance with this disclosure, at least one component of the system 200 includes a tool 232 that analyzes routine operating data for a model-based controller in order to detect significant model-plant mismatch. The process for detecting significant model-plant mismatch is described below. Also, as described in more detail below, the tool 232 can use a support vector machine as part of the analysis of the routine operating data. The tool 232 could be implemented in any suitable manner and using any suitable device, such as when the tool 232 resides on the controller 204 or a dedicated computing device. The tool 232 could be implemented using any suitable hardware or any suitable combination of hardware and software/firmware instructions, such as when the tool 232 is implemented using software/firmware instructions that are executed by at least one processor of a computing device.

Although FIG. 2 illustrates another example of an industrial process control and automation system 200, various changes may be made to FIG. 2. For example, other systems could be used to produce other paper or non-paper products. Also, while shown as including a single paper machine 202 with various components and a single controller 204, the system 200 could include any number of paper machines or other machinery having any suitable structure, and the system 200 could include any number of controllers. In addition, while FIG. 2 illustrates another example environment in which model-plant mismatch detection using model parameter data clustering can be used, this functionality can be used in any other suitable device or system.

Figure 3:
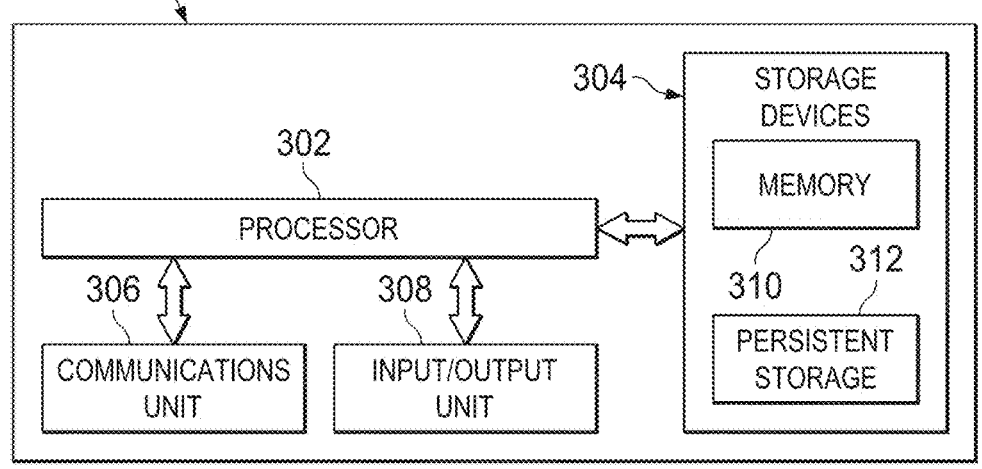
FIG. 3 illustrates an example device supporting model-plant mismatch detection using model parameter data clustering according to this disclosure.

FIG. 3 illustrates an example device 300 supporting model-plant mismatch detection using model parameter data clustering according to this disclosure. The device 300 could, for example, represent any of the devices in FIGS. 1 and 2 that can execute the tool 146, 232. However, the device 300 could be used in any other suitable system, and the tool 146, 232 could be implemented using any other suitable device.

As shown in FIG. 3, the device 300 includes at least one processing device 302, at least one storage device 304, at least one communications unit 306, and at least one input/output (I/O) unit 308. The processing device 302 executes instructions that may be loaded into a memory device 310. The processing device 302 may include any suitable number(s) and type(s) of processors or other devices in any suitable arrangement. Example types of processing devices 302 include microprocessors, microcontrollers, digital signal processors, field programmable gate arrays, application specific integrated circuits, and discrete logic devices.

The memory device 310 and a persistent storage 312 are examples of storage devices 304, which represent any structure(s) capable of storing and facilitating retrieval of information (such as data, program code, and/or other suitable information on a temporary or permanent basis). The memory device 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 supporting model-plant mismatch detection using model parameter data clustering, various changes may be made to FIG. 3. For example, various components in FIG. 3 could be combined, further subdivided, rearranged, or omitted and additional components could be added according to particular needs. Also, computing devices can come in a wide variety of configurations, and FIG. 3 does not limit this disclosure to any particular configuration of computing device.

Figure 4:
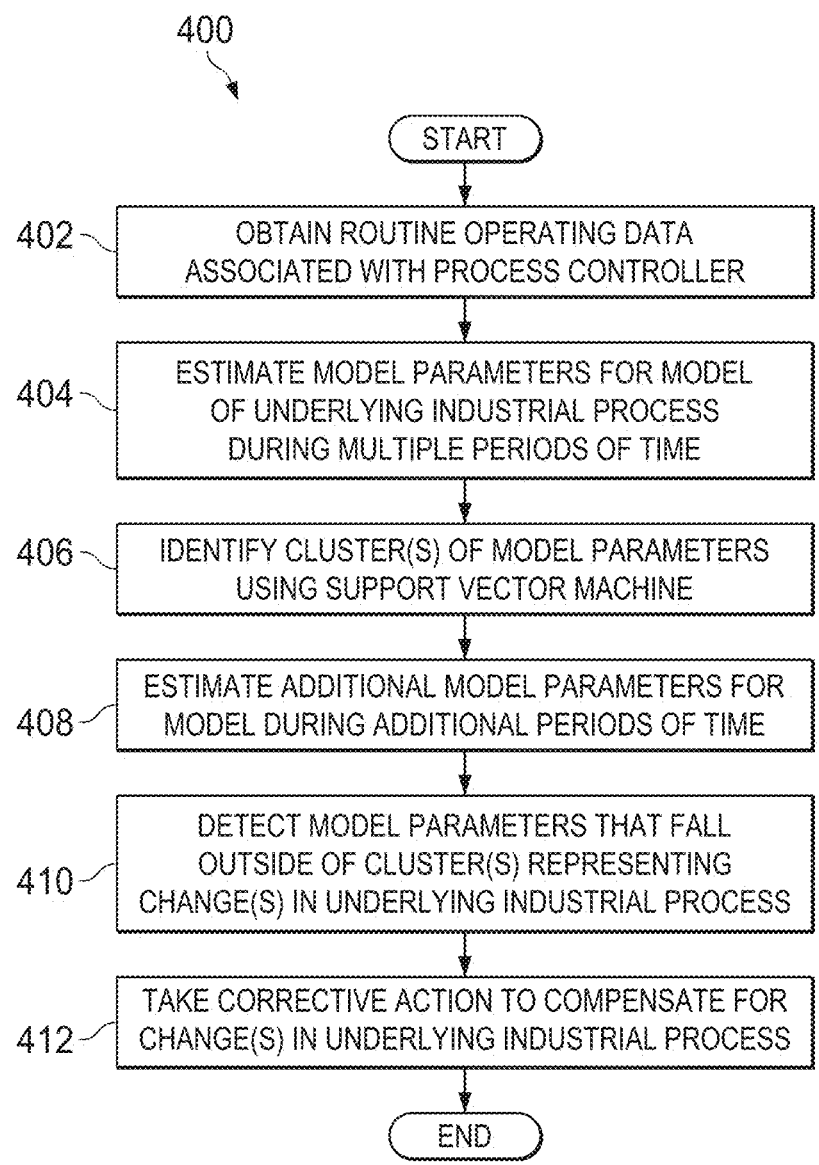
FIG. 4 illustrates an example method for model-plant mismatch detection using model parameter data clustering according to this disclosure.

FIG. 4 illustrates an example method 400 for model-plant mismatch detection using model parameter data clustering according to this disclosure. For ease of explanation, the method 400 is described below as being implemented using the device 300 of FIG. 3 in the systems 100, 200 of FIGS. 1 and 2. However, the method 400 could be performed using any suitable device and in any suitable system.

As shown in FIG. 4, routine operating data associated with a model-based industrial process controller is obtained at step 402. This could include, for example, the processing device 302 that executes the tool 146, 232 obtaining data associated with operation of a model-based controller (such as a controller 106 or 204) from that controller or from another device. If the tool 146, 232 is executed within the controller 106 or 204, this could include the processing device 302 collecting the routine operating data during execution of control logic by the controller.

Model parameters for a process model representing an underlying industrial process are repeatedly estimated during multiple periods of time at step 404. This could include, for example, the processing device 302 that executes the tool 146, 232 performing a model identification algorithm using the routine operating data to identify parameters for a process model. There are a number of model identification algorithms and tools that are known in the art. This could be repeated at a specified interval or at other times. In some embodiments, the tool 146, 232 uses a moving or sliding window of data and uses the data within the window to estimate the model parameters each time the model identification algorithm is executed.

One or more clusters of the model parameter sets are identified at step 406. Since the quality of the routine operating data used in step 404 may be low, the estimates of the model parameters can have a lot of uncertainty around them. However, the sets of parameter estimates can form a cluster over time. This step could include, for example, the processing device 302 that executes the tool 146, 232 using a support vector machine to determine the clustering of the model parameter sets. A support vector machine could implement a kernel function that generates a linear or nonlinear clustering of data by mapping original data into a space where a cluster boundary can be identified.

Additional model parameter sets for the process model are estimated during one or more additional periods of time at step 408. This could include, for example, the processing device 302 that executes the tool 146, 232 performing the same operations as in step 404 with different data to identify the additional model parameter sets. A determination is made whether any of the additional model parameter sets falls outside of the identified cluster(s) at step 410. This could include, for example, the processing device 302 that executes the tool 146, 232 determining whether any of the additional model parameter sets is separated from an identified cluster by at least some threshold distance. If so, this is indicative of a significant change to the underlying industrial process, and some type of corrective action can be taken at step 412. This could include, for example, the processing device 302 that executes the tool 146, 232 generating an alarm indicating that a model-plant mismatch has been detected. Operators may then perform or initiate a model identification process to collect data in order to generate a new process model or to update an existing process model. This may also include the processing device 302 initiating a model identification process to collect data in order to generate a new process model or to update an existing process model. The model identification process could be performed by the processing device 302 or by another device. Any other or additional actions could also occur in response to an identified model-plant mismatch.

Although FIG. 4 illustrates one example of a method 400 for model-plant mismatch detection using a support vector machine to cluster data, various changes may be made to FIG. 4. For example, while shown as a series of steps, various steps in FIG. 4 could overlap, occur in parallel, occur in a different order, or occur any number of times.

Additional details regarding specific techniques for model-plant mismatch detection using model parameter data clustering are provided below. Note that the details provided below are examples only and that other implementations of the techniques described in this patent document could be used. Also note that while specific details are provided below, other implementations of the techniques described below could be used.

The following describes a framework for model-plant mismatch (MPM) detection based on a novel closed-loop identification approach and a one-class support vector machine (SVM) learning technique. With this scheme, the detection framework can monitor for both model-plant mismatch and noise model changes separately, thus discriminating the model-plant mismatch from the noise model changes. This approach is applicable to routine operating data that may lack external excitations. It can be shown that the closed-loop identification techniques described below furnish a consistent and Gaussian distributed parameter estimate for a process model. An SVM model can be built based on process and noise model estimates from training data to predict the occurrence of model-plant mismatch.

Figure 5:
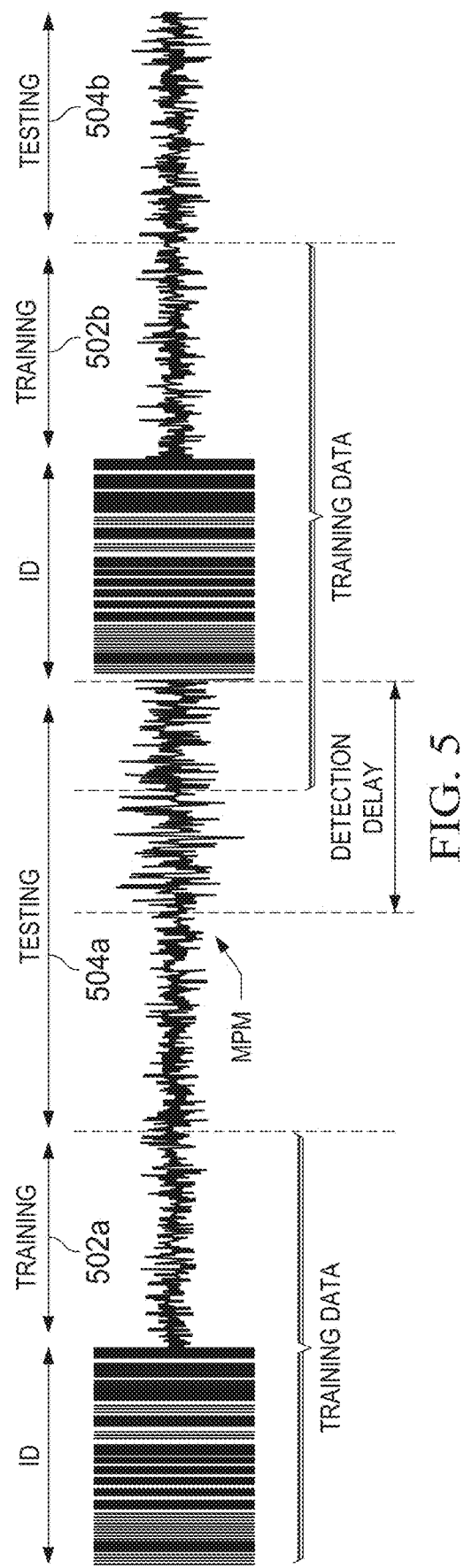
FIGS. 5 through 7 illustrate example uses of model-plant mismatch detection according to this disclosure.
Figure 6:
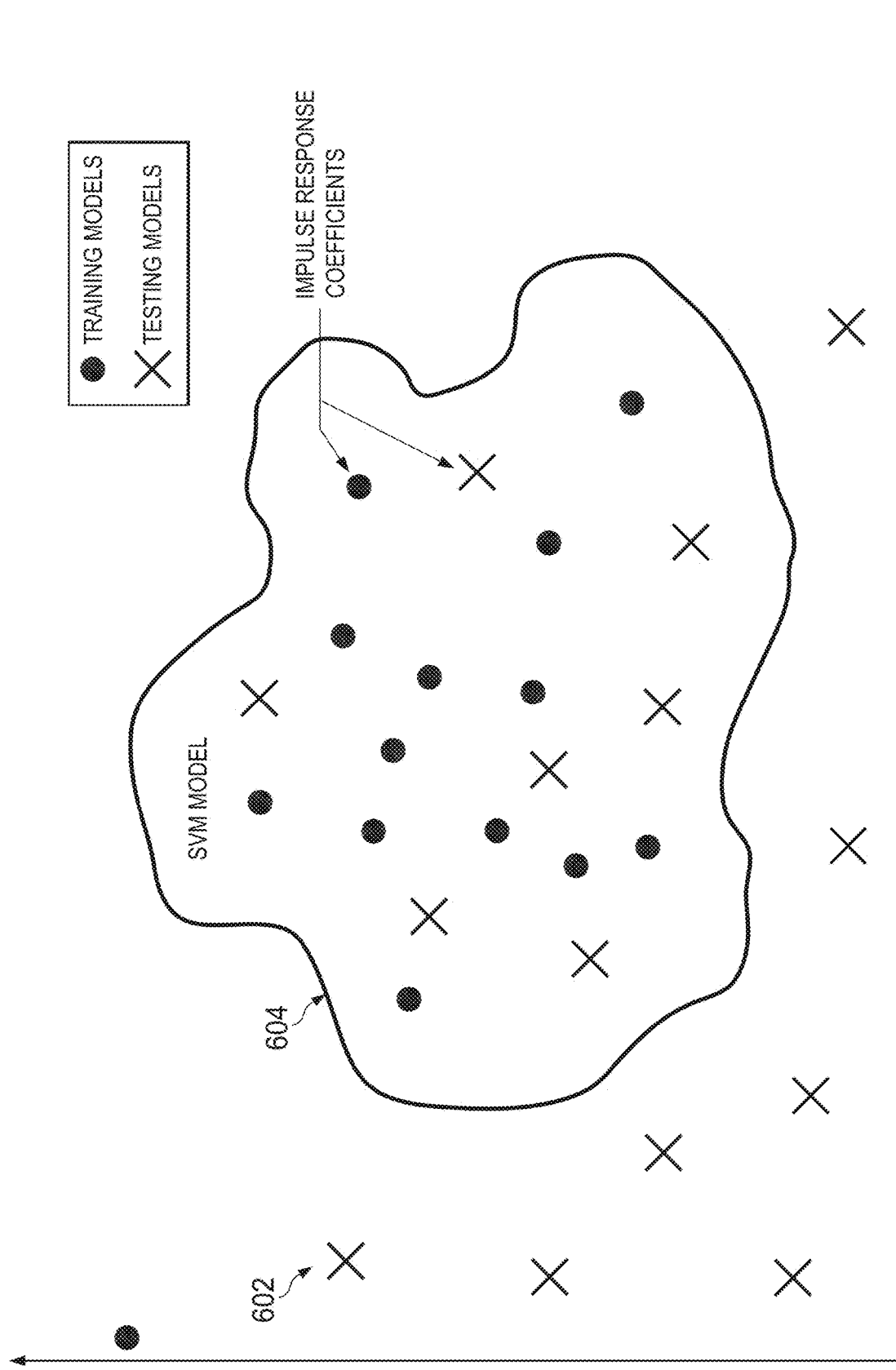
Figure 7:
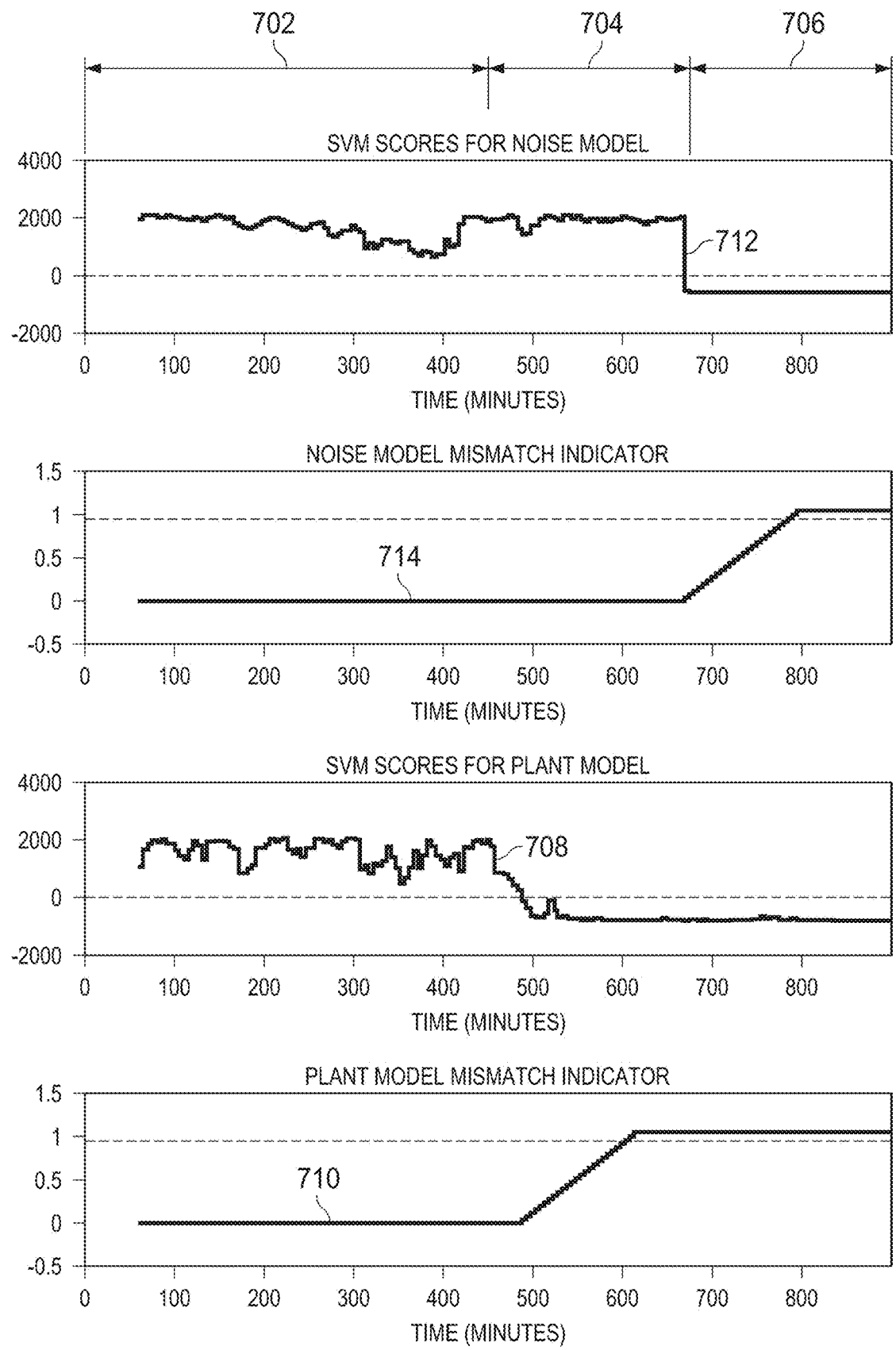

In general, the approach described below involves the following. Routine operating data is partitioned into "training" data (believed to contain no model-plant mismatch) and "testing" data. The training data serves as a benchmark, and the presence of model-plant mismatch in the testing data is detected using that benchmark. Based on closed-loop identification and support vector machine classification, model-plant mismatch and noise changes can be detected independently, allowing this approach to discriminate model-plant mismatch from noise model changes. This can occur with or without external excitations. FIGS. 5 through 7 illustrate example uses of model-plant mismatch detection according to this disclosure.

Model-Plant Mismatch Detection Algorithm

This section explains the overall concept of detecting the presence of model-plant mismatch with routine operating data. Note that noise model change detection can follow the same general process as model-plant mismatch detection. Thus, in the following description, model-plant mismatch detection is described in detail, but the same or similar approach could be used for noise model change detection.

The model-plant mismatch detection algorithm is based generally on a novel closed-loop identification technique, which is capable of supplying consistent estimates for a process model with routine operating data (assuming the data is sufficiently exciting for relevant system identification objectives). However, the inevitable variance associated with process model estimates could impede direct comparisons of results with nominal models to expose mismatches. In other words, discrepancies between model estimates and true models cannot always be blamed on model-plant mismatch and might be attributed merely to variance. Because of this, a reasonable variation range (or an uncertainty bound) around an estimated process model due to the variance of parameter estimates can be determined, and elements outside this range can be regarded as mismatched models. Such a range can be naturally portrayed using the SVM technique. Note that to synthesize all possible mismatch situations (such as gain mismatches and time constant mismatches) with an overall metric, process model estimates can be estimated using finite impulse response (FIR) forms. Measuring differences in high-dimensional spaces can be non-trivial, which leads to the use of a support vector machine for this task.

FIG. 5 illustrates the concept of detecting model-plant mismatch, where routine operating data is split or divided into training data and testing data. In FIG. 5, there are two training stages 502a-502b (which include routine operating data classified as training data) and two test stages 504a-504b (which include routine operating data classified as testing data). The training data is collected during one or more time intervals in which model-plant mismatch is not likely present, such as periods during or right after a model identification stage.

A moving window can be used to process the routine operating data, and the size of the training data can be selected according to the window size. For each window, closed-loop identification can be applied to attain an estimate of the process model. A one-class SVM can be trained using the estimated process models determined with the training data, and the SVM can be viewed as an appropriate bound encompassing the estimated process models.

FIG. 6 illustrates the concept of detecting model-plant mismatch with an SVM technique. In FIG. 6, each point 602 stands for an FIR representation of a model. The models in circles are those obtained from training data, and they form a benchmarking cluster 604. The models in cross points are those obtained from testing data, and those models outside the benchmarking cluster 604 are viewed as mismatched models. Any model inside the boundary of the benchmarking cluster 604 is considered normal, indicating the absence of model-plant mismatch.

For the testing data, a moving window is again used, and closed-loop identification can be applied to attain an estimate of the process model for each window. Each process model estimate obtained during testing is examined by the support vector machine to predict whether it is located inside the boundary of the benchmarking cluster 604. If so, the support vector machine returns a value (such as a positive score) indicating that no model-plant mismatch has been detected. Otherwise, the support vector machine returns a different value (such as a negative score) to indicate the presence of model-plant mismatch in the current window. To be cautious in triggering an identification experiment, an MPM alarm might not be raised until a specified number of MPM indications have been obtained, such as a specified number of negative scores within a specified time period. Note that all of the training and testing operations can be performed with routine operating data free of external excitations.

Closed-Loop Identification

As can be seen from the above description, closed-loop identification is used repeatedly in the proposed MPM detection algorithm, namely to (i) identify process models with training data in order to train the SVM and (ii) identify process models with testing data to detect model-plant mismatch. Various closed-loop identification techniques have been developed over the years, such as direct identification, indirect identification, joint input-output identification, and projection. However, none of these approaches may be suitable for use in the MPM detection problem. For example, the latter three identification techniques require the inclusion of an external dither signal and/or a linear feedback controller, while the direct identification method often leads to biased estimates of a process model if the noise model structure is not sufficiently specified. Described below is a novel closed-loop identification approach that aims to resolve the bias issue and fit into the MPM detection context. It can be shown that the proposed technique gives consistent estimates for a process model provided some mild technical assumptions are satisfied.

Consider the following single-input single-output (SISO) Box-Jenkins plant:

$$y(t)=G_0(q)u(t)+H_0e(t) \quad (1)$$

where $G_0$ and $H_0$ denote the true plant model and the true noise model, respectively. Suppose that $H_0$ is monic, stable, and inversely stable. The plant $G_0(q)$ is assumed to contain at least one sample delay, q is the unit-shift operator, and e(t) is assumed to be zero-mean Gaussian white noise with constant variance $\sigma^2$. Here, y(t) and u(t) represent the output and input signals, respectively, and it is assumed that all relevant signals are quasi-stationary. In a closed loop with MPC, a feedback controller often displays nonlinear dynamics (if the constraints are active). This can be expressed as:

$$u(t)=k(t,u^{t-1},y^t) \quad (2)$$

where $u^{t-1}=[u(1), \ldots, u(t-1)]$ and $y^t=[y(1), \ldots, y(t)]$.

For cases with external excitations, a persistently-exciting dither signal can guarantee that closed-loop data is informative, regardless of the controller order. Without external excitations, to achieve the informativity requirement for linear controllers, the following relationship can be satisfied for Box-Jenkins models:

$$\max(n_x-n_f,n_y-n_b) \geq n_d+\min(n_x,n_f) \quad (3)$$

where $n_x$ and $n_y$ denote the numerator and denominator orders of the linear controller, respectively. Also, $n_b$ and $n_f$ denote the orders of the process model numerator and denominator polynomials, respectively. Further, $n_d$ denotes the order of the numerator polynomial of the noise model. One observation from Equation (3) is that complex controllers and a larger time-delay often imply richer information in closed-loop data. Additionally, if the controller is nonlinear (as is often the case of an MPC), closed-loop data is generally sufficiently exciting for relevant system identification. Another benefit of using a nonlinear controller is that it can prevent the identification algorithm from identifying the controller inverse as the process model estimate. Moreover, a priori information about the time delay can be available and specified to the identification algorithm.

The bias associated with direct closed-loop identification arises from improper specification of the noise model structure. In order to circumvent this limitation, an FIR model can be used as the noise model structure. Specifically, the true process model of Equation (1) can be re-written into an equivalent form as follows:

$$\frac{1}{H_0}y(t) = \frac{1}{H_0}G_0(q)u(t) + e(t) \quad (4)$$

This can be represented using an infinite-order autoregressive exogenous (AR) model with:

$$A_0(q)y(t) = B_0(q)u(t) + e(t) \quad (5)$$

Here:

$$A_0(q) = \frac{1}{H_0(q)} = 1 + a_1^0 q^{-1} + \ldots + a_n^0 q^{-n} + \ldots \quad (6)$$

$$B_0(q) = A_0(q)G_0(q) = b_0^0 q^{-d} + b_1^0 d^{-d-1} + \cdots + b_n^0 q^{-d-n} + \ldots \quad (7)$$

where d is the true time-delay. The proposed closed-loop identification described below includes two general steps: (i) high-order ARX model estimation from closed-loop data and (ii) output-error (OE) identification with filtered input-output data (where the filter is chosen as the estimated $A_0(q)$ polynomial).

High-Order ARX Model Identification

For an open-loop stable system, it can be shown that the coefficients of $A_0(q)$ are vanishing for growing n, and the same holds for $B_0(q)$. Thus, the infinite-order ARX model of Equation (5) can be parameterized using a high-order ARX model as follows:

$$A(q, \eta_n)y(t) = B(q, \eta_n)u(t) + e(t) \quad (8)$$

where:

$$A(q, \eta_n) = 1 + \sum_{k=1}^{n} a_k q^{-k}, \; B(q, \eta_n) = \sum_{k=0}^{n} b_k q^{-d-k} \quad (9)$$

Denote:

$$\eta_n = [\, a_1 \; \ldots \; a_n \; b_1 \; \ldots \; b_n \,]^T \quad (10)$$

$$\eta_0 = [a_1^0 \; \ldots \; a_n^0 \; \ldots \; b_1^0 \; \ldots \; b_n^0 \; \ldots]^T \quad (11)$$

For notational simplicity, choose $A(q, \eta_n)$ and $B(q, \eta_n)$ to be of the same order. To reduce large parameter covariance resulting from high orders, a regularization term can be added here.

Suppose that the following relationship holds for the selected high-order ARX model structure shown in Equation (8):

$$n \to \infty, \; n^{3+\delta}/N \to 0, \text{ as } N \to \infty \quad (12)$$

where n is the order of Equation (8), N is the sample number, and $\delta > 0$ is a constant. With this assumption, the following can be obtained:

$$\sup_{\omega} |A(e^{j\omega}, \hat{\eta}_n) - A_0(e^{j\omega})| \to 0, \; w.p.1, \text{ as } N \to \infty \quad (13)$$

where:

$$\hat{\eta}_n = [\, \hat{a}_1 \; \ldots \; \hat{a}_n \; \hat{b}_1 \; \ldots \; \hat{b}_n \,]^T \quad (14)$$

represents the estimate of parameter vector $\eta_n$.

It can be shown that when the order of the high-order ARX model in Equation (8) increases to infinity (but with a much slower increase rate than N), the estimate $A(e^{j\omega}, \hat{\eta}_n)$ converges uniformly to the true polynomial $A_0(e^{j\omega})$ with a probability of one. This essentially depicts the behavior of the high-order ARX model under a large number of data samples. This provides a theoretical basis for the subsequent OE identification with filtered input and output data since the estimated filter $A(e^{j\omega}, \hat{\eta}_n)$ approximates the true filter $A_0(e^{j\omega})$ sufficiently well. Note that $n \to \infty$ is merely an assumption for theoretical derivations, and a finite n that is based on apriori information regarding the noise model could be used when implementing the identification algorithm.

OE Identification with Filtered Input-Output Data

Replacing $H_0(q)$ in Equation (4) with the inverse of the estimated noise model $A(e^{j\omega}, \hat{\eta}_n)$ from Equation (13), the following can be obtained:

$$y(t,\hat{\eta}_n) = G_0(q)u(t,\hat{\eta}_n) + e(t) \quad (15)$$

where $y(t, \hat{\eta}_n)$ represents the signal filtered through $A(q,\eta)$. A similar definition can be provided for $u(t,\hat{\eta}_n)$. To identify $G_0(q)$, an FIR model to $G_0(q)$ can be specified if no a priori information is available. However, in typical industrial processes, some knowledge is available to correctly parameterize the plant model. For example, in the machine direction (MD) process of paper machines, it is widely accepted that a first-order plus time-delay model is sufficient to precisely capture the system dynamics.

With this in mind, an OE identification could occur as follows:

$$y(t,\hat{\eta}_n) = G(q,\rho)u(t,\hat{\eta}_n) + e(t) \quad (16)$$

where $G(q,\rho)$ is a correctly-selected plant model structure. The parameter $\rho$ could be estimated by minimizing the following criterion:

$$\hat{\rho}_N = \arg\min_{\rho \in \Omega_\rho} \frac{1}{N} \sum_{t=1}^{N} \frac{1}{2} \varepsilon^2(t, \rho, \hat{\eta}_N) \quad (17)$$

where $\Omega_\rho$ is a compact set. The prediction error $\varepsilon(t, \rho, \hat{\eta}_n)$ can be defined as:

$$\varepsilon(t, \rho, \hat{\eta}_n) = [G_0(q) - G(q, \rho)]u(t, \hat{\eta}_n) + \frac{A(q, \hat{\eta}_n)}{A_0(q)} e(t) \quad (18)$$

With respect to the parameter estimate $\hat{\rho}_N$, consider the true Box-Jenkins model for the plant as specified in Equation (1), as well as the equivalent high-order ARX form in Equation (5). Assuming the plant model is correctly parameterized and the parameter estimates $\hat{\rho}_N$ from the prediction error criterion in Equation (17) are consistent, the following can be obtained:

$$\hat{\rho}_N \to \rho_0, \; w.p.1, \text{ as } N \to \infty \quad (19)$$

where $\rho_0$ is the true parameter value of $G_0$. Moreover, the parameter estimates $\hat{\rho}_N$ are Gaussian distributed with mean value $\rho_0$.

Despite the premise on the correct parameterization of $G_0(q)$ above, this is not a restrictive limitation on the proposed closed-loop identification method. As described below, the support vector machine in the MPM detection is trained and tested on the FIR form of $G(q, \hat{\rho}_N)$. Thus, if a priori information on $G_0(q)$ is not accessible, a FIR model could be used in the OE identification to eliminate bias.

Compared with existing closed-loop identification methods, the proposed approach can have various advantages. For example, the proposed approach may require no information about a controller and thus is applicable to closed-loop data with both linear and nonlinear controllers. Also, the proposed approach does not rely on external excitations but is suitable for cases with external excitations. In addition, a consistent estimate of a process model can be obtained even if a priori information about the noise model is not available. Note that the explicit expression of the variance of $\hat{\rho}_N$ is nontrivial, so it may be recommended to use a set of training data from which a group of process model estimates can be obtained and used as an approximation of the variance of transfer function estimates. From this standpoint, more training data could be preferred.

One-Class Learning SVM

As a convention, a support vector machine can be useful particularly for binary classification problems in machine learning. A support vector machine searches for a hyperplane that separates two classes of data with a maximum distance to either class. One example benefit of such a hyperplane is its robustness to outliers, which can help to considerably reduce false classifications. For MPM detection, the process models generated using the training data can be used as a reference group representing the behavior of a "no mismatch" process model cluster. However, the other group of data is ordinarily not accessible since abnormal situations may occur in a variety of ways (such as various parametric mismatches, irregular disturbances, and so on). Thus, MPM detection is a one-class learning problem, which is also known as a "novelty detection problem."

A one-class learning SVM is depicted in a feature space, meaning a space to which data is mapped. Consider the following set of training data samples:

$$x_1, x_2, \ldots, x_l \in X \subset R^m \quad (20)$$

where l is the number of training data values and X is a subset (called an input space) of $R^m$. Before training the one-class SVM, data is mapped through $\Phi: X \to F$ into a higher-dimensional feature space F. A kernel function K(x, y) could be used such that the inner product in the feature space can be evaluated in the input space as:

$$K(x,y) = \langle \Phi(x), \Phi(y) \rangle, \forall x, y \in X \quad (21)$$

A well-known kernel function that could be used is the Gaussian kernel:

$$K(x,y) = e^{-\|x-y\|^2/c} \quad (22)$$

With a Gaussian kernel function, data points in the feature space are located in the same quadrant since K(x, y)>0, $\forall$x, y$\in$X. Thus, it is possible to find a hyperplane to separate the origin from the training data in the feature space with maximized margin.

With this idea, the one-class SVM training problem could be formulated as follows:

$$\min_{w,\xi,b} \frac{1}{2}\|w\|^2 + \frac{1}{v\ell}\sum_{i=1}^{\ell} \xi_i - b \quad (23)$$

$$\text{s.t. } w^T \Phi(x_i) \geq b - \xi_i, \xi_i \geq 0 \quad (24)$$

where w and b represent the slope and offset of the hyperplane in the feature space. The term v$\in$[0, 1] is a parameter tuning the upper bound of the fraction of outliers and the lower bound of the fraction of support vectors. The term is a slack variable allowing for local violations of the hard boundary determined by the hyperplane.

The above optimization problem can be solved, such as by quadratic programming, giving rise to a sparse solution. Here, sparse means that the solution to Equation (23) can be completely determined using a small number of support vectors. With the optimizing variables $\hat{w}$ and $\hat{b}$, the decision (or score value) function can be described as:

$$h(x) = \hat{w}^T \Phi(x) - \hat{b} \quad (25)$$

The solution $\hat{w}$ is a convex combination of images of support vectors in the feature space through the mapping $\Phi$. As a result, the inner product in the predictor function in Equation (25) can be calculated via the kernel function rather than in the high-dimensional feature space. The introduction of kernel functions significantly expands the flexibility in constructing separating hyperplanes, enabling the SVM to generate a nonlinear boundary.

One issue in applying a one-class SVM training strategy is the limited amount of training data provided by the industry. Taking a paper machine as an example, grade changes (setpoint changes) often take place on a daily basis, and training data has to be collected after each grade change to represent the current operating condition of the paper machine before carrying out MPM detection. Consequently, only a few process model estimates from training data may be available to build an SVM model. In order to overcome this issue, a resampling technique could be used to enlarge the cluster of "no mismatch" models estimated from training data before performing SVM training.

To perform the resampling technique, a probability density function (PDF) can be fit to each impulse response (IR) coefficient of an estimated process model. Then, a large number of samples can be generated by sampling randomly from the fitted probability density function. For example, denote the FIR form of the estimated process model $G(q, \hat{\rho}_N)$ in the $k^{th}$ moving window as:

$$G(q, \hat{\rho}_N^k) = \hat{g}_0^k q^d + \hat{g}_1^k q^{d-1} + \ldots + \hat{g}_m^k q^{d-m} \quad (26)$$

Here, m is a pre-specified number, and k=1, 2, ..., $N_k$ are indices for the moving window in the training data. The FIR coefficients $\hat{g}_i^k$ (for i=0, ..., m) are Gaussian distributed since $\hat{\rho}_N$ has a Gaussian distribution. For each coefficient $\hat{g}_i^k$, several estimated values are attained from the moving window in the training data. Then, rough estimators for the mean and variance of each IR coefficient can be constructed as follows:

$$\hat{\mu}_i = \mu(\hat{g}_i^1, \hat{g}_i^2, \ldots, \hat{g}_i^{N_k}), i=0, \ldots, m \quad (27)$$

$$\hat{\sigma}_i^2 = \sigma(\hat{g}_i^1, \hat{g}_i^2, \ldots, \hat{g}_i^{N_k}), i=0, \ldots, m \quad (28)$$

where $\mu(\cdot)$ and $\sigma(\cdot)$ are functions, such as the sample mean and sample variance.

Due to the limited amount of training data ($N_k$ normally is small), the estimated PDF for each FIR coefficient can be much more conservative compared with the true probability density function. Thus, a parameter a can be used to tune the width of the probability density function to avoid this problem. One potential rule of thumb in selecting $\alpha$ is to use a small value if there is a large amount of training data or a large value if there is a small amount of training data. A larger scaling factor may make the mismatch detection algorithm less sensitive to mismatch, while a smaller scaling factor may make the mismatch detection algorithm more sensitive to mismatch.

Once the rough estimators are determined, a large number of samples of each FIR coefficient can be randomly generated, subject to the corresponding estimated probability density function. Then, a one-class SVM model can be developed from these enhanced samples for the initial cluster of "good" process models.

MPM Detection with SVM

Once the one-class SVM is trained, the trained SVM can be used to process additional model estimates to identify whether the additional model estimates are part of the cluster of "good" process models. The FIR coefficients of the process model identified from each moving window in the testing data can be estimated, such as by using the same procedure described above. Once the estimated FIR coefficients are obtained, the SVM model is applied to predict whether the estimated FIR coefficients belong to the initial cluster. If so, the SVM can return a positive score value or other value indicating that the current testing window does not display mismatch. Otherwise, the SVM can return a negative score or other value to signify a mismatch. However, to be cautious before starting a new identification experiment, a specified number of mismatch reports within some time period may need to be collected before triggering an alarm. For example, define $I_t$ as the sign of the score value for time instant t:

$$I_t = \text{sign}(h(x_t)) \quad (29)$$

with $x_t$ denoting the FIR coefficient vector of the plant model estimate for the window data at time t. Denote $T_t = \{t-n_T, t-1, t\}$, where $n_T$ is a detection interval (the number of previous moving windows under inspection to determine the existence of MPM). Further define an MPM indicator as follows:

$$s = \frac{|I_-|}{|I_-| + |I_+|} \qquad (30)$$

where $I_-:=\{I_i=-1:i\in T_t\}$, $I_+:=\{I_i\neq-1:i\in T_t\}$, and $|S|$ is the number of elements in the set S. A user could specify a threshold $s_T$ for the MPM indicator to raise an MPM alarm (such as a conservative $s_T$ value like 0.95) to be circumspect in reporting the MPM alarm.

Note that the MPM detection method presented above can also be applied to the noise model estimate $A(q, \hat{\eta}_n)$ from Equation (8) to find any noise model mismatch. In this way, the process and noise models can be monitored separately to distinguish model-plant mismatch from noise model changes.

Example results that could be obtained using these techniques are shown in FIG. 7, which relates to dry weight measurements associated with a web of paper being manufactured. In FIG. 7, time is divided into three periods 702-706. Period 702 denotes a period of normal operation, period 704 denotes a period where model-plant mismatch actually exists, and period 706 denotes a period where both model-plant mismatch and noise model mismatch actually exist.

Line 708 in FIG. 7 denotes the scores generated by the mismatch detection algorithm for the plant model, and line 710 in FIG. 7 denotes a mismatch indicator that identifies whether model-plant mismatch is being detected. As can be seen in FIG. 7, the line 708 starts with values that are greater than zero and then transitions to values that are less than zero. The negative values are indicative of model-plant mismatch, so the line 710 transitions from values at or near zero to more positive values. Eventually, the line 710 could hit a maximum value, which is indicative of a specified number of SVM scores indicating model-plant mismatch.

Similarly, line 712 in FIG. 7 denotes the scores generated by the mismatch detection algorithm for a noise model, and line 714 in FIG. 7 denotes a mismatch indicator that identifies whether noise model mismatch is being detected. As can be seen in FIG. 7, the line 712 starts with values that are greater than zero and then transitions to values that are less than zero. The negative values are indicative of noise model mismatch, so the line 714 transitions from values at or near zero to more positive values. Eventually, the line 714 could hit a maximum value, which is indicative of a specified number of SVM scores indicating noise model mismatch.

The identification of a mismatch in the noise model without a corresponding mismatch in the plant model allows the mismatch detection algorithm to avoid a false alarm. Of course, in other instances, a mismatch in the noise model could raise an alert.

Although FIGS. 5 through 7 illustrate example uses of model-plant mismatch detection, various changes may be made to FIGS. 5 through 7. For example, these figures are provided merely to illustrate example functions or results associated with the model-plant mismatch detection algorithm. Other uses or implementations of the model-plant mismatch detection algorithm are possible, and FIGS. 5 through 7 do not limit this disclosure to any particular use or implementation.

Summary

This disclosure has presented a novel model-plant mismatch detection algorithm that can separate model-plant mismatch from noise model changes, and this technique is applicable to routine operating data that lacks external excitations. A novel closed-loop identification method has been described that can give consistent parameter estimates for a process model without the need for any a priori information on the noise model. The mismatch detection problem is divided into a training stage and a testing stage. In the training stage, an SVM model is developed based on process and noise model estimates. The SVM model is then used to predict the occurrence of model-plant mismatch in the testing data. This approach is tailored to satisfy industrial demands for model-plant mismatch monitoring.

Note that while often described as being used for model-plant mismatch detection with respect to an industrial process controller, the techniques described in this patent document can be applied to various situations where there is a mathematical model of a process and a desire to check (possibly continuously) if the true process behavior is changing from what was originally modelled. The parameters of a model can be monitored, and the model parameters are not necessarily associated with an industrial process controller.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for controlling an operation of a paper machine in a web manufacturing system, the method comprising:
    obtaining routine operating data associated with a model-based controller;
    repeatedly identifying one or more values for one or more model parameters of at least one model associated with a process at multiple periods of time, the one or more values for the one or more model parameters identified using data associated with the process by estimating the one or more model parameters at each of the multiple periods of time;
    clustering the values of the one or more model parameters into one or more clusters using a support vector machine, the support vector machine using a kernel function to generate a clustering of data by mapping the data into a space where a cluster boundary is identified;
    identifying one or more additional values for the one or more model parameters using additional data which is different than the data associated with the process during one or more additional periods of time;
    detecting using a tool, a mismatch between the at least one model and the process in response to determining that at least some of the one or more additional values fall outside of the one or more clusters, the tool analyzing the routine operating data for the model-based controller using the support vector machine for detecting the mismatch; and
    taking corrective action in response to detecting the mismatch.

2. The method of claim 1, wherein:
    the process comprises an industrial process;
    at least one industrial process controller is configured to control at least part of the industrial process using the at least one model.

3. The method of claim 2, wherein the corrective action comprises generating at least one new or updated model for the industrial process controller.

4. The method of claim 1, wherein repeatedly identifying the one or more values for the one or more model parameters comprises using a moving or sliding window of operating data associated with the process.

5. The method of claim 1, wherein identifying the one or more values and identifying the one or more additional values each comprises performing closed-loop model identification by:
    identifying a first model using closed-loop data;
    filtering the closed-loop data based on the first model; and
    identifying a second model based on the filtered closed-loop data.

6. The method of claim 5, wherein:
    the first model comprises a high-order autoregressive exogenous (ARX) model; and
    the second model comprises an output-error (OE) model.

7. The method of claim 1, wherein the detected mismatch indicates that the process has changed and is no longer accurately represented by the at least one model.

8. An apparatus for controlling an operation of a paper machine in a web manufacturing system, the apparatus comprising:
    at least one memory configured to store data associated with a process; and
    at least one processing device configured to:
        obtain routine operating data associated with a model-based controller;
        repeatedly identify one or more values for one or more model parameters of at least one model associated with the process using the data associated with the process at multiple periods of time, the one or more values for the one or more model parameters identified using data associated with the process by estimating the one or more model parameters at each of the multiple periods of time;
        cluster the values of the one or more model parameters into one or more clusters using a support vector machine, the support vector machine using a kernel function to generate a clustering of data by mapping the data into a space where a cluster boundary is identified;
        identify one or more additional values for the one or more model parameters using additional data which is different than the data associated with the process during one or more additional periods of time; and
        detect using a tool, a mismatch between the at least one model and the process in response to determining that at least some of the one or more additional values fall outside of the one or more clusters, the tool analyzing the routine operating data for the model-based controller using the support vector machine for detecting the mismatch; and
    taking corrective action in response to detecting the mismatch.

9. The apparatus of claim 8, wherein:
    the process comprises an industrial process;
    an industrial process controller is configured to control at least part of the industrial process using at least one model.

10. The apparatus of claim 9, wherein, to take the corrective action, the at least one processing device is configured to initiate generation of at least one new or updated model for the industrial process controller.

11. The apparatus of claim 8, wherein, to repeatedly identify the one or more values for the one or more model parameters, the at least one processing device is configured to use a moving or sliding window of operating data associated with the process.

12. The apparatus of claim 8, wherein, to identify the one or more values or the one or more additional values, the at least one processing device is configured to perform closed-loop model identification, the closed-loop model identification comprising:
    identifying a first model using closed-loop data;
    filtering the closed-loop data based on the first model; and
    identifying a second model based on the filtered closed-loop data.

13. The apparatus of claim 12, wherein:
the first model comprises a high-order autoregressive exogenous (ARX) model; and
the second model comprises an output-error (OE) model.

14. A non-transitory computer readable medium for controlling an operation of a paper machine in a web manufacturing system, containing instructions that, when executed by at least one processing device, cause the at least one processing device to:
obtain routine operating data associated with a model-based controller;
repeatedly identify one or more values for one or more model parameters of at least one model associated with a process at multiple periods of time, the one or more values for the one or more model parameters identified using data associated with the process by estimating the one or more model parameters at each of the multiple periods of time;
cluster the values of the one or more model parameters into one or more clusters using a support vector machine, the support vector machine using a kernel function to generate a clustering of data by mapping the data into a space where a cluster boundary is identified;
identify one or more additional values for the one or more model parameters using additional data which is different than the data associated with the process during one or more additional periods of time; and
detect using a tool, a mismatch between the at least one model and the process in response to determining that at least some of the one or more additional values fall outside of the one or more clusters, the tool analyzing the routine operating data for the model-based controller using the support vector machine for detecting the mismatch; and
take corrective action in response to detecting the mismatch.

15. The non-transitory computer readable medium of claim 14, wherein:
the process comprises an industrial process;
an industrial process controller is configured to control at least part of the industrial process using at least one model.

16. The non-transitory computer readable medium of claim 15, wherein the instructions that when executed cause the at least one processing device to take the corrective action comprise:
instructions that when executed cause the at least one processing device to initiate generation of at least one new or updated model for the industrial process controller.

17. The non-transitory computer readable medium of claim 14, wherein the instructions that when executed cause the at least one processing device to repeatedly identify the one or more values for the one or more model parameters comprise:
instructions that when executed cause the at least one processing device to use a moving or sliding window of operating data associated with the process.

* * * * *